United States Patent [19]

Johnson, Jr. et al.

[11] 3,854,134

[45] Dec. 10, 1974

[54] RADIO RANGING UTILIZING DOPPLER SIGNALS

[75] Inventors: Raymond C. Johnson, Jr., Gainesville, Fla.; Salvador J. Peperone, Silver Spring, Md.

[73] Assignee: The United States of America as represented by the Secretary of the Army, Washington, D.C.

[22] Filed: Dec. 28, 1966

[21] Appl. No.: 607,595

[52] U.S. Cl. .............................. 343/14, 343/12 R
[51] Int. Cl. .......................................... G01s 9/24
[58] Field of Search .................. 343/10, 12, 13, 14

[56] References Cited
UNITED STATES PATENTS 3,189,899   6/1965   Scater ................................. 343/14
3,247,511   4/1966   Burrows ........................... 343/14 X
3,283,321   11/1966  Ward ................................. 343/14

*Primary Examiner*—Maynard R. Wilbur
*Assistant Examiner*—G. E. Montone
*Attorney, Agent, or Firm*—Saul Elbaum

[57] ABSTRACT

A radio ranging system utilizing a frequency modulated continuous wave signal which derives range information from the mixed product of the received and transmitted signals, from the proportion of Doppler signal in the mixed product. The received signal is mixed with the transmitted signal, and the output of the mixer is clipped. The Doppler signal is extracted from the clipped signal, and its amplitude is a measure of range.

6 Claims, 2 Drawing Figures

PATENTED DEC 10 1974　　　　　　　　　　　　　　　　　　3,854,134

INVENTORS
RAYMOND C. JOHNSON, Jr.
SALVADOR J. PEPERONE

BY Harry M. Saragovitz
Edward J. Kelly   Herbert Berl
& J. D. Edgerton
                    ATTORNEYS

RADIO RANGING UTILIZING DOPPLER SIGNALS

The present invention relates to the measurement of distance or range between two points by the technique of radio ranging, i.e., transmitting a radio energy wave from one of said points, and receiving at that point the energy of the radio wave as reflected from the second point, and processing the received energy to derive range information. In particular, the present invention is directed to the use of a continuous radio wave which is frequency modulated (CW-FM) for the purpose of radio ranging, and to deriving the range information from the Doppler signal. It is presently contemplated that the principles of this invention will find their greatest utility in proximity fuses, i.e., in fuses for bombs, missiles, projectiles, etc., which are designed to be exploded when attaining a preselected range from the target, particularly those intended to explode a given distance above a target area on the earth. However, it is understood that the invention is also applicable to other areas of radio ranging, and it should not be construed as necessarily limited to the proximity fuse application.

The present invention is not the first to derive range information from the Doppler signal in a CW-FM radio ranging system. For example, in U.S. Pat. No. 3,108,273, issued Oct. 22, 1963, to Stephen J. Erst, there is disclosed a CW-FM radio ranging system, utilizing the Doppler signal in the reflected energy to ascertain range. In that system the patentee utilizes the amplitude of the Doppler signal for determining range, relying upon the range square law which defines that the strength of a radio signal diminishes with the square of the distance. One basic difficulty with such a system is that the strength of the received signal is obviously affected not only by range, but also by the size and reflectivity of the target from which the reflections are obtained. Accordingly, such a system is inherently of limited utility where reasonably high accuracy is desired.

On the other hand, the present system is independent of the range square law effect, and is independent of the size or reflectivity of the target, provided of course that the target is of sufficient size and reflectivity to provide a processable reflected signal. In other words, the system of the present invention is not dependent upon signal strength as a measure of range. The present invention is based upon the recognition that when the reflected CW-FM wave is mixed with the transmitted wave, the ratio of the strength of the Doppler component to the rest of the energy in the resultant signal is a function of range, and since a ratio is involved, obviously received signal strength is not a factor.

This concept is based upon the fact that the phase difference between the transmitted and received reflected signal increases with an increase in range between the transmitting station and the reflecting target, and with a frequency modulated wave a change in phase relationship between transmitted and received signals results in a change in frequency difference therebetween; and likewise the Doppler signal is also a frequency difference between transmitted and received reflected signals. Thus, when the CW-FM reflected signal is mixed with the transmitted signal, the greater the range, the less is the proportion of the Doppler component in the resultant signal. For example, at a theoretical zero range, the reflected wave and the transmitted wave are exactly in phase, and the difference frequency is zero, except for the Doppler effect. Therefore, all the energy of the mixer output difference frequency is in the Doppler component. As range increases, and as the frequency modulated reflected wave becomes more and more out of phase with the transmitted wave, it will be readily appreciated that the difference frequency output of the mixer contains a less and less percentage of Doppler signal energy, and a correspondingly greater and greater percentage of the energy is in the other components of the mixer output.

Accordingly, the percentage of Doppler signal power in the mixer output is a function of range, and any given percentage always occurs at the same range for a given modulation level, regardless of the magnitude of the received signal strength. It is the utilization of this relationship that is the subject matter of the present invention.

It is accordingly one object of the present invention to provide for radio ranging utilizing Doppler signals to measure range.

Another object of the invention is to provide for such radio ranging wherein the transmitted signal is a CW-FM wave.

Another object of the invention is to provide for radio ranging with a CW-FM signal, by measuring the ratio or percentage of Doppler signal power to the remainder of the power in the signal resulting from the mixing of the received and transmitted waves.

Other objects and advantages of the present invention will become apparent to those skilled in the art from a consideration of the following detailed description of the invention had in conjunction with the accompanying drawings, in which like numerals refer to like or corresponding parts, and wherein.

Figure 1:
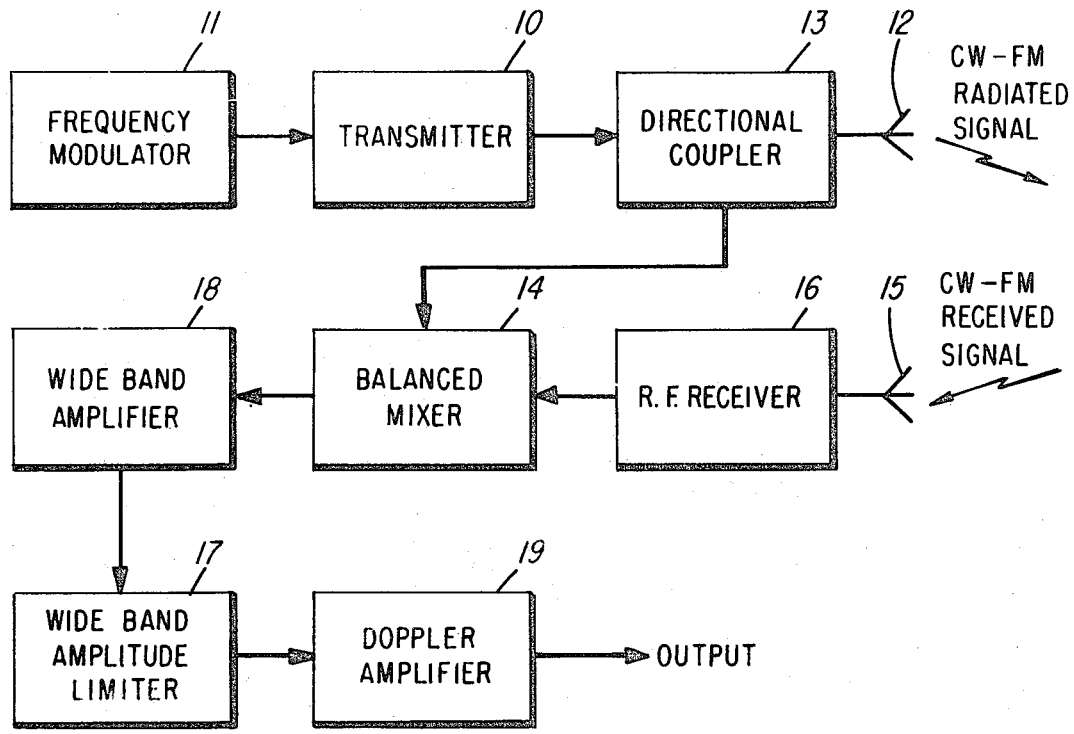
FIG. 1 is a block diagram of a system embodying the present invention.

Referring to FIG. 1, the functional block diagram of the system comprises a conventional CW-FM transmitter 10, modulated in the usual way by frequency modulator 11. The modulator may for the purposes of the present invention cause the transmitter frequency to vary about its center frequency randomly, as with a Gaussian noise modulation, or the modulating signal may be periodic, as for example a sawtooth wave. The resultant signal is radiated by the antenna 12, while a portion of the transmitter output is coupled by the directional coupler 13 into the balanced mixer 14 of the signal processing section of the system, as is usual in a radio ranging system. The radiated CW-FM signal impinges upon a target and is reflected by the target to the receiving antenna 15.

That portion of the reflected signal that reaches the antenna 15 is amplified in the RF receiver 16 and coupled into the balanced mixer 14, where the transmitted and received signals are beat with each other. The output of the mixer 14 contains the frequency difference between the transmitted and received signals. This difference signal is caused in part by the change in modulation due to the lapse in time between signal transmission and reception of the reflected signal, and in part by the Doppler signal resulting from the movement of the transmitter-receiver system relative to the reflecting target. As explained above, the greater the range to the target, the greater is the portion of the difference signal energy which is attributable to the former factor, and the lesser is the portion attributable to the Doppler signal. It is the purport of the present invention to utilize this relationship to measure target range.

In order to isolate this relationship from the variable of received signal strength, and thereby eliminate errors that would result from different target sizes and different target reflectivities, the entire output of the mixer is passed through a wide band symmetric amplitude limiter 17, where the processed signal is clipped to a level below that which would be obtained from the minimum received signal strength at which it is contemplated that the system should operate. The mixer output can obviously be amplified in a wide band amplifier 18 before clipping. In this manner the processed signal level is fixed, and is independent of received signal strength. Obviously, by this process the range square law has also been eliminated as a factor in the processed signal.

The clipped or limited signal is then passed through a Doppler amplifier 19, which may be a low frequency response amplifier, or a separate low frequency pass filter may be provided if desired. The amplitude of the resultant output signal is then a function of the percentage of Doppler signal energy in the mixer output, and by suitable calibration constitutes a measure of target range. As previously stated, this measure is substantially independent of target size and target reflectivity considerations.

Figure 2:
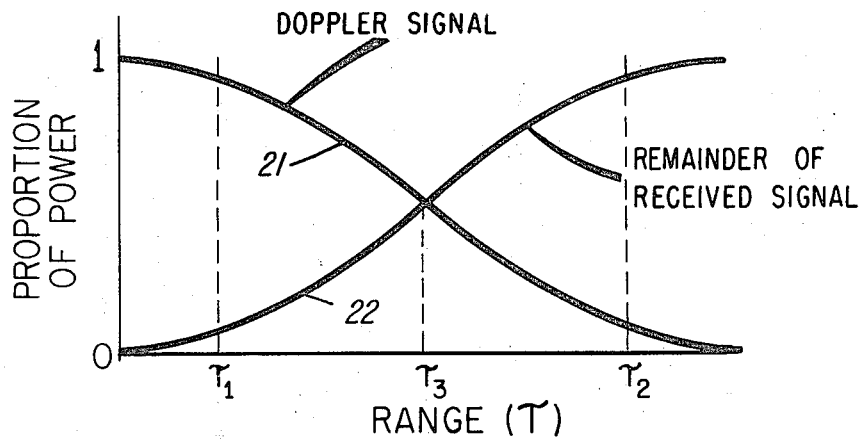
FIG. 2 is a graph illustrating the effect of range on the proportion of energy present in the Doppler signal of a CW-FM wave processed in accordance with the present invention.

FIG. 2 is a graphical illustration of the proportion of power in the mixer output for both the Doppler component and the remainder of the signal, plotted against target range $\tau$, using random Gaussian noise as the frequency modulation. Curve 21 is a plot of the proportion of the Doppler component, and curve 22 is a plot of the proportion of the remainder of the signal. Obviously, the sum of the two proportions must be the same for all values of $\tau$; i.e., at a short range $\tau_1$, the Doppler component proportion dominates and is nearly equal to 1, while the remainder of the signal is very small, and at a long range $\tau_2$, the converse is true, while at a particular mid-range $\tau_3$, the two components are equal and each accounts for one half of the total signal. The output of the limiter 17 contains these proportions in terms of voltage or amplitude, and it can be shown mathematically that the Doppler signal, curve 21, is expressed by the equation:

$$e_d(R) \approx e^{-k\tau^2}$$

which is the function sought to be illustrated by curve 21. When curve 21 is plotted with voltage or amplitude along the ordinate, it provides the conversion factor for translating the output amplitude from Doppler amplifier 19 to range.

Accordingly it will be appreciated that a system is provided for measuring range by CW-FM radio ranging, utilizing the amplitude of the processed Doppler signal as the measured function of range. In particular it should be noted that the present system avoids the errors and limitations of other systems that seek to derive range information from signal strength, by eliminating from the processed signal variations in signal strength as result from different target sizes and reflectivities, and other factors that cause unpredictable changes in signal strength. The foregoing specific embodiment of the invention is presented only for illustrative purposes, and it is not intended that the invention be considered as limited thereto. Obviously, changes and variations will be apparent to those skilled in the art, and such modifications as are embraced by the spirit and scope of the appended claims are contemplated as being within the purview of this invention.

What is claimed is:

1. A radio ranging system comprising means for radiating a CW-FM radio signal, means for receiving a portion of said signal as reflected by an object, means for mixing the received signal with the signal being radiated to obtain the difference frequency signal thereof, and means for measuring the proportion of Doppler signal power in said difference frequency signal.

2. A system as set forth in claim 1, wherein said measuring means comprises means for limiting said difference frequency signal, and means for separating the Doppler component of said limited signal, whereby the amplitude of said Doppler component is a measure of the proportion of Doppler power in said received signal.

3. A system as set forth in claim 2, and further including means for amplifying the difference frequency signal.

4. A system as set forth in claim 3, wherein said Doppler component separating means is a low frequency response amplifier.

5. A radio ranging system comprising a radio transmitter for radiating a continuous radio wave signal, a modulator for effecting a frequency modulation of said wave, means for receiving signal energy of said wave as reflected from an object, a mixer for beating the received signal with the transmitted signal, means for limiting the output of the mixer, and low frequency response means for measuring the proportion of Doppler signal power in said mixer output.

6. A system as set forth in claim 5, and further including means for amplifying the output of said mixer in advance of said limiting means.

* * * * *